(12) United States Patent
Takahashi et al.

(10) Patent No.: US 8,844,544 B2
(45) Date of Patent: Sep. 30, 2014

(54) DEVICE AND METHOD FOR FILTERING PROCESSING LIQUID IN PROCESSING TANK

(75) Inventors: Kazuaki Takahashi, Iruma (JP); Takeshi Sakamoto, Tokyo (JP)

(73) Assignees: Industria Co., Ltd., Irumi-Shi (JP); Honda Motor Co., Ltd., Tokyo (JP)

( * ) Notice: Subject to any disclaimer, the term of this patent is extended or adjusted under 35 U.S.C. 154(b) by 735 days.

(21) Appl. No.: 12/918,560

(22) PCT Filed: Feb. 6, 2009

(86) PCT No.: PCT/JP2009/000483
§ 371 (c)(1),
(2), (4) Date: Nov. 10, 2010

(87) PCT Pub. No.: WO2009/104365
PCT Pub. Date: Aug. 27, 2009

(65) Prior Publication Data
US 2011/0048458 A1 Mar. 3, 2011

(30) Foreign Application Priority Data
Feb. 20, 2008 (JP) ................................. 2008-038311

(51) Int. Cl.
| | | |
|---|---|---|
| B08B 3/04 | (2006.01) | |
| B08B 3/14 | (2006.01) | |
| B01D 21/24 | (2006.01) | |
| C23G 3/00 | (2006.01) | |
| B01D 21/02 | (2006.01) | |
| B01D 21/26 | (2006.01) | |
| B08B 3/02 | (2006.01) | |

(52) U.S. Cl.
CPC ... B08B 3/14 (2013.01); C23G 3/00 (2013.01); B01D 21/2416 (2013.01); B01D 21/02 (2013.01); B01D 21/245 (2013.01); B01D 21/267 (2013.01); B01D 2221/14 (2013.01); B08B 3/02 (2013.01); B01D 21/2488 (2013.01); B01D 21/2472 (2013.01)

USPC ............... 134/104.2; 134/85; 134/104.04; 134/109; 134/110; 134/111; 204/482; 204/512

(58) Field of Classification Search
CPC ............... B01D 21/2472; B01D 21/24; B01D 3/24724; B08B 3/04; B08B 3/14; B08B 3/01; B08B 3/041
USPC ............. 134/85, 104.2, 104.4, 109, 110, 111; 204/482, 512, 626
See application file for complete search history.

(56) References Cited

U.S. PATENT DOCUMENTS 6,003,683 A * 12/1999 McCarthy ..................... 209/727
6,139,708 A * 10/2000 Nonomura et al. ........... 204/482

(Continued)

FOREIGN PATENT DOCUMENTS

| EP | 0905286 | 3/1999 |
| JP | 1-106573 | 7/1989 |

(Continued)

*Primary Examiner* — Saeed T Chaudhry
(74) *Attorney, Agent, or Firm* — Rankin, Hill & Clark LLP

(57) ABSTRACT

A device for filtering a processing liquid in a processing tank includes an opening for recovering a surface-layer processing liquid on a work-discharging side of the tank, a separating part for recovering an intermediate-layer processing liquid on a work-receiving side of the tank, a hopper for recovering a bottom-layer processing liquid on a bottom surface on the work-receiving side, a first processing liquid discharge nozzle on a bottom surface of the tank and which is oriented in an opposite direction to a work-conveying direction and toward the bottom surface, second processing liquid discharge nozzles on both side surfaces of the processing tank and which are oriented in an opposite direction to the work-conveying direction and toward a work, cyclone devices which filter the processing liquids recovered by the opening, the separating part, and the hopper, and which individually separate foreign material, a separating tank, and a screw conveyor.

4 Claims, 8 Drawing Sheets

(56) References Cited

U.S. PATENT DOCUMENTS

| | | |
|---|---|---|
| 2005/0139472 A1 | 6/2005 | Hara |
| 2007/0163886 A1* | 7/2007 | Hara et al. .............. 204/622 |

FOREIGN PATENT DOCUMENTS

| | | | |
|---|---|---|---|
| JP | 11-047666 | | 2/1999 |
| JP | 11-106996 | | 4/1999 |
| JP | 11-123341 | | 5/1999 |
| JP | 2001-129313 | | 5/2001 |
| JP | 2001-190902 | | 7/2001 |
| JP | 2002-159803 | * | 6/2002 |
| JP | 2002-282609 | | 10/2002 |
| JP | 2002-292209 | | 10/2002 |
| JP | 2003-145167 | * | 5/2003 |
| JP | 2003-313687 | | 11/2003 |
| JP | 2004-162157 | | 6/2004 |
| JP | 2005-187930 | | 7/2005 |
| JP | 2005-211809 | | 8/2005 |
| JP | 2006-326445 | | 12/2006 |

* cited by examiner

DEVICE AND METHOD FOR FILTERING PROCESSING LIQUID IN PROCESSING TANK

TECHNICAL FIELD

The present invention relates to a device and a method for filtering a processing liquid in a processing tank so as to remove from the processing tank foreign material that becomes detached from a work when the work is immersed in the processing liquid.

BACKGROUND ART

Foreign materials such as iron powder, fibers, weld sealers, and press forming oil, which adhere to a body of a vehicle during various processes at a press shop or a welding shop, hinder a paint process. Accordingly, the automotive body is immersed in a processing liquid during a degreasing process that is an initial process at a paint shop in order to remove adherent foreign material.

Conventionally, the removal of foreign material involves moving an automotive body immersed in a processing liquid against a counterflow of the processing liquid and removing foreign material using ultrasound and high-pressure jets of a cleaning liquid. In a known procedure, foreign material removed from the automotive body is then extracted together with the cleaning liquid from an extraction outlet provided on a bottom part of a cleaning tank, and the foreign material is separated from the cleaning liquid by a cleaning liquid reprocessing device in order to reuse the cleaning liquid (for example, refer to Patent Document 1).

In addition, a configuration is disclosed in which foreign material settled on a bottom part of a recovery tank in a pre-paint processing device is separated by a liquid cyclone into a processing liquid in which the foreign material is diluted and a processing liquid in which the foreign material is concentrated, the processing liquid containing the diluted foreign material is returned to the recovery tank to be reused as processing liquid, and the processing liquid containing the concentrated foreign material is once more separated into processing liquid and foreign material by a conveyor-type filter (for example, refer to Patent Document 2).

Patent Document 1: Japanese Patent Laid-Open No. 2004-162157

Patent Document 2: Japanese Patent Laid-Open No. 11-047666

DISCLOSURE OF THE INVENTION

Problems to be Solved by the Invention

However, with a technique such as that described in Patent Document 1, since it is difficult to extract all of the foreign material accumulated over the entire bottom surface of the cleaning tank from the extraction outlet, the foreign material accumulated on the bottom surface is churned up by movements of the automotive body or the like and problematically re-adhere to the automotive body.

In addition, various foreign materials with different specific gravities are incorporated into the cleaning liquid in the cleaning tank, wherein a part of the foreign materials settles to the bottom of the tank, another part of the foreign materials is suspended in an intermediate layer, and yet another part of the foreign materials is suspended in a surface layer. For example, even with iron powder that has a high specific gravity, while relatively large iron powder settles to the bottom of the tank, extremely small powder becomes suspended in the cleaning liquid together with fiber and the like. The foreign material suspended in the cleaning liquid problematically re-adheres to the automotive body from which foreign material has been removed in the cleaning tank and causes a painting defect in a subsequent electrodeposition process.

Furthermore, foreign material containing cleaning liquid removed from the cleaning tank is separated and removed by a cleaning liquid reprocessing device made up of a pre-filter using a cyclone, a tank, and a filtering machine that combines a cyclone and a filter. Since cleaning liquid remains in foreign material collected by the cyclone and also in foreign material settled and accumulated in the tank, once a given amount is accumulated, the foreign materials containing the cleaning liquid is transported to a processing plant to be separated and processed, whereby the foreign material is discarded as-is while the cleaning liquid is neutralized and then disposed. Such a procedure is troublesome and problematically results in high cost.

Moreover, with a technique such as that described in Patent Document 2, since foreign material with low specific gravity is suspended without being removed and the processing liquid containing the diluted foreign material is returned to the recovery tank and reused as processing liquid, the foreign material problematically re-adheres to the automotive body. In addition, when separating foreign material from processing liquid with a conveyor-type filter, the need for constantly monitoring filter clogging and frequently replacing the filter problematically makes the procedure troublesome and results in an increase in device size and in higher cost. A clogged filter causes spillage of the processing liquid to the outside and may present an environmental concern. While a method involving the use of a centrifugal separator is also conceivable, such a method is susceptible to clogging, which problematically results in an increase in device size and in higher cost.

The present invention has been made in consideration of such problems existing in conventional art, and an object of the present invention is to provide a filtering device and a filtering method capable of reliably removing foreign material from inside of a processing tank.

Means for Solving the Problems

In order to solve the problems described above, a first aspect of the present invention is a device for filtering a processing liquid in a processing tank in which a conveyed work is immersed in the processing liquid to be processed, the device for filtering a processing liquid in a processing tank including: a first recovery part for collecting a surface-layer processing liquid on a work-discharging side of the processing tank; a second recovery part for collecting an intermediate-layer processing liquid on a work-receiving side of the processing tank; a third recovery part for collecting a bottom-layer processing liquid on a bottom surface on the work-receiving side of the processing tank; a processing liquid discharge nozzle which is arranged at least on a bottom surface of the processing tank and which is oriented in an opposite direction to a work-conveying direction and toward the bottom surface; processing liquid discharge nozzles which are arranged on both side surfaces of the processing tank and which are oriented in an opposite direction to the work-conveying direction and toward a work; separating means which filter processing liquids recovered by the first to third recovery parts and which respectively separate foreign material; a separating tank for mainly storing foreign material separated by the separating means; and discharging means which separate only foreign material from the foreign material and the processing liquid stored in the separating tank and which discharge the foreign material.

A second aspect of the present invention is the device for filtering a processing liquid in a processing tank according to the first aspect of the present invention, wherein the separating tank is connected to the separating means and separates only the foreign material from the stored foreign material and processing liquid.

A third aspect of the present invention is the device for filtering a processing liquid in a processing tank according to the first or second aspect of the present invention, wherein at least the second recovery part and the third recovery part are connected to the separating means that is made up of two or more separating means connected in cascade.

A fourth aspect of the present invention is the device for filtering a processing liquid in a processing tank according to any one of the first to third aspects of the present invention, wherein the separating means has a cyclone mechanism.

A fifth aspect of the present invention is the device for filtering a processing liquid in a processing tank according to any one of the first to fourth aspects of the present invention, wherein a grooved part having a plurality of concave and convex shapes is formed at least on a bottom surface of the processing tank in a work-conveying direction, and the processing liquid discharge nozzle oriented toward the bottom surface is arranged at a site opposing a center of the concavities of the grooved part.

A sixth aspect of the present invention is a method of filtering a processing liquid in a processing tank in which a conveyed work is immersed in the processing liquid to be processed, the method of filtering a processing liquid in a processing tank including the steps of: respectively recovering and filtering processing liquids from an upper layer, an intermediate layer, and a bottom layer of the processing liquid stored in the processing tank; separating foreign material from the processing liquid; spraying filtered processing liquid into the processing tank and further filtering the separated foreign material into foreign material and processing liquid; and spraying filtered processing liquid into the processing tank and discharging the separated foreign material to the outside.

Advantages of the Invention

According to the first aspect of the present invention, since foreign material that is either suspended or accumulated in the processing tank can be collected together with the processing liquid by the respective recovery parts, foreign material can be reliably separated and removed from the processing liquid by the separating means and, at the same time, the filtered processing liquid can be reused without having to be discarded, effective utilization of the processing liquid can be achieved.

According to the second aspect of the present invention, since only foreign material is further removed by separating means from the processing liquid of the separating tank that mainly stores foreign material separated by the separating means, the processing liquid can be effectively utilized without having to be discarded.

According to the third aspect of the present invention, since foreign material and processing liquid are separated by the separating means made up of two or more separating means connected in cascade, only foreign material can be reliably removed and the filtered processing liquid can be reused without having to be discarded.

According to the fourth aspect of the present invention, foreign material and processing liquid can be reliably separated by a cyclone mechanism.

According to the fifth aspect of the present invention, foreign material that is either suspended or accumulated in the processing tank can be guided to the first to third recovery parts.

According to the sixth aspect of the present invention, since foreign material that is either suspended or accumulated in the processing tank can be recovered together with the processing liquid, foreign material can be reliably separated and removed from the processing liquid and, at the same time, the filtered processing liquid can be reused without having to be discarded, effective utilization of the processing liquid can be achieved.

Figure 1:
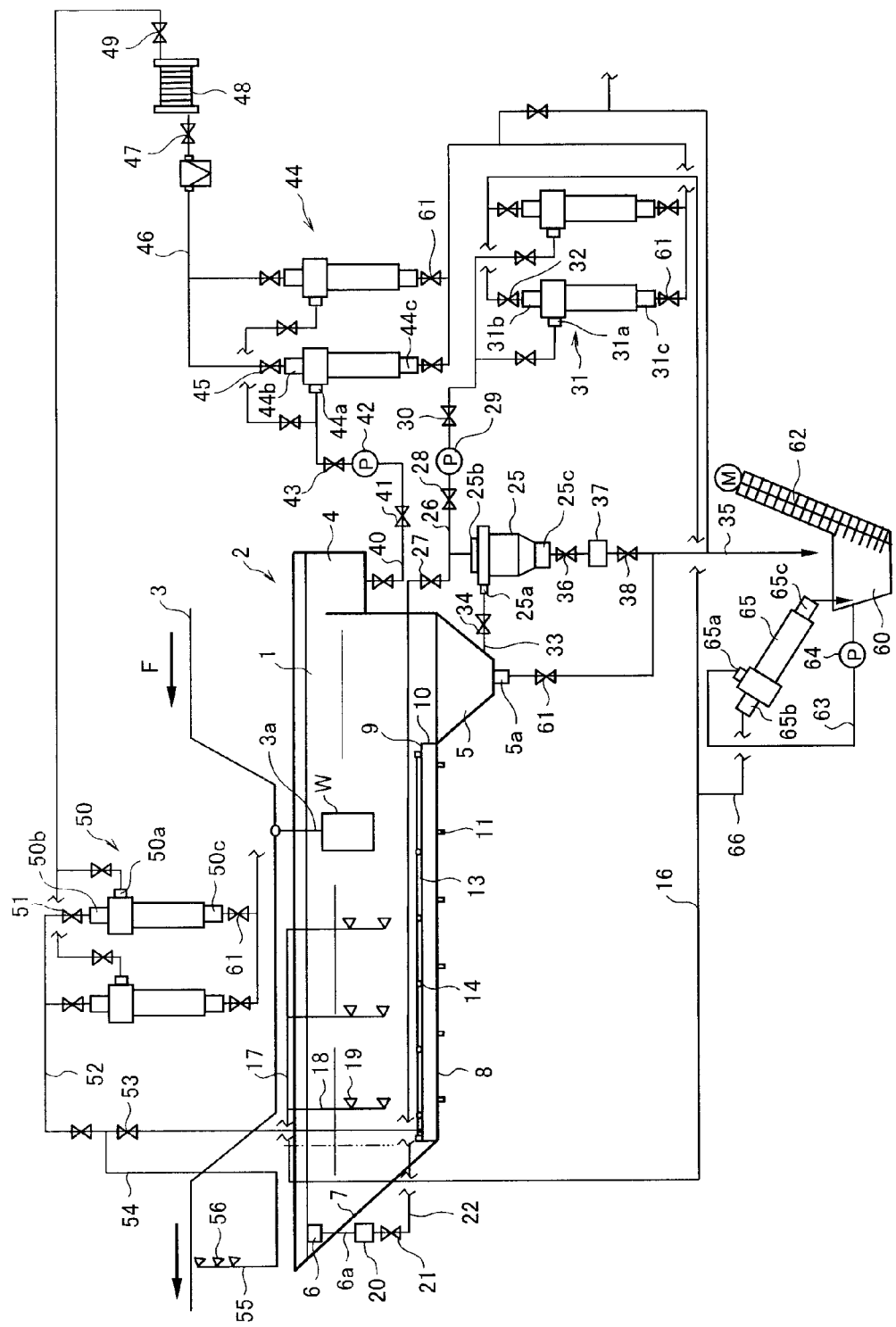
FIG. 1 is an explanatory diagram of a schematic configuration of a first embodiment of a device for filtering a processing liquid in a processing tank according to the present invention.

DESCRIPTION OF SYMBOLS 1 processing liquid
2 processing tank
3 conveyor
4 separating part (second recovery part)
5 hopper (third recovery part)
6 opening (first recovery part)
7 inclined part
8 bottom surface
9, 69 grooved part
10, 70 steel plate member
11, 71 reinforcing member
12a concavity (bottom part)
12b, 72b convexity (ridge)
13 first processing liquid supply pipe
14 first branch pipe
15 first processing liquid discharge nozzle
19 second processing liquid discharge nozzle
25 first cyclone device (separating means)
31 second cyclone device (separating means)

44 third cyclone device (separating means)
50 fourth cyclone device (separating means)
60 separating tank
62 screw conveyor (discharging means)
65 fifth cyclone device (separating means)
72a concavity (valley)
W automotive body (work)

BEST MODE FOR CARRYING OUT THE INVENTION

Figure 2:
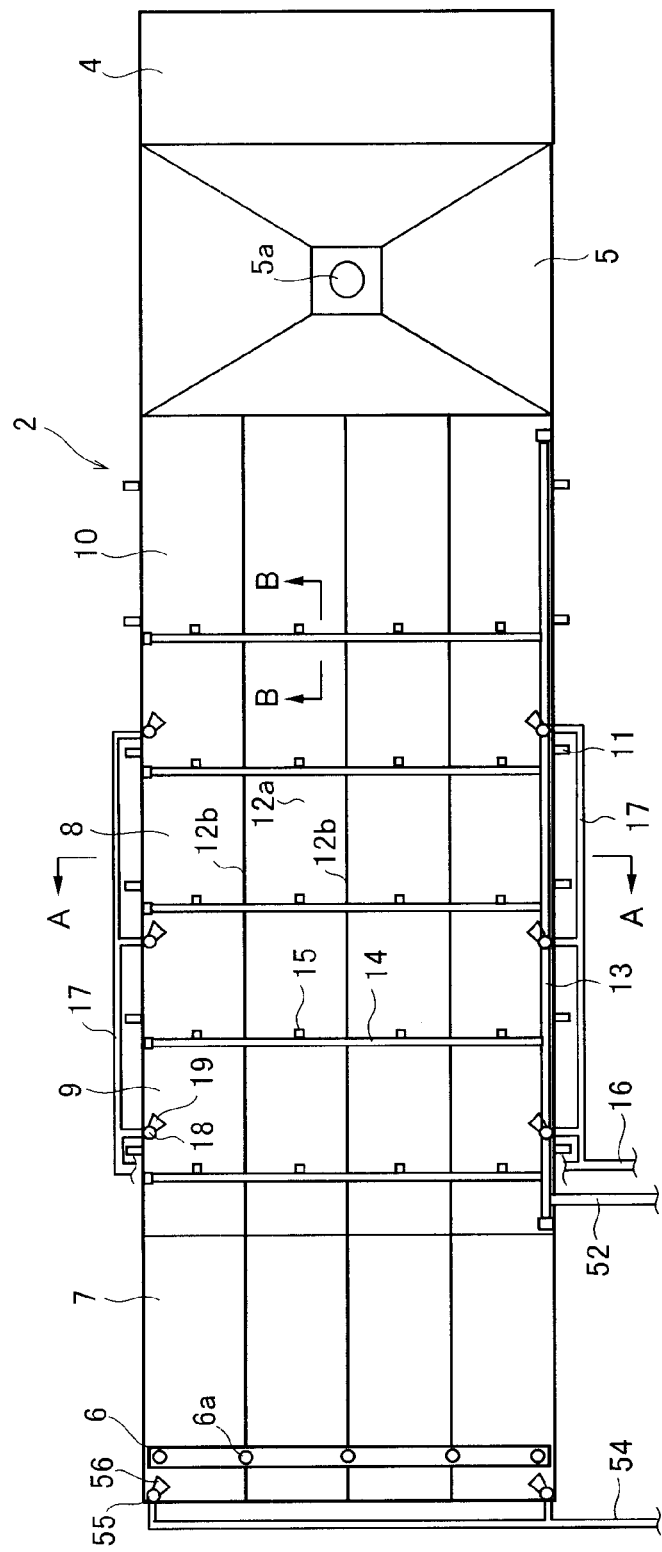
FIG. 2 is a plan view of the first embodiment of a device for filtering a processing liquid in a processing tank according to the present invention.
Figure 3:
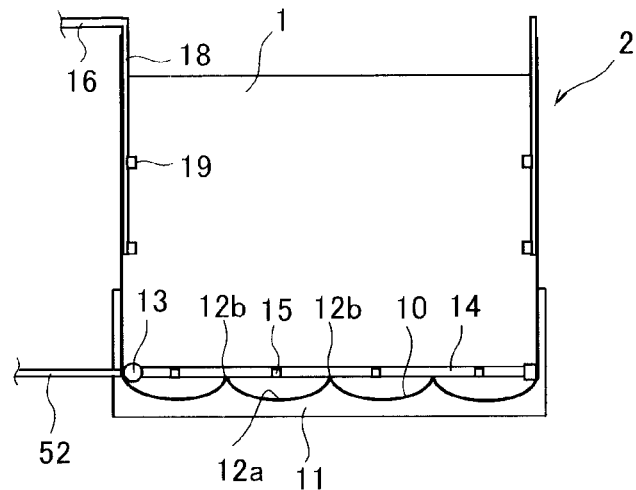
FIG. 3 is a cross-sectional fragmentary view taken along A-A in FIG. 2.
Figure 4:
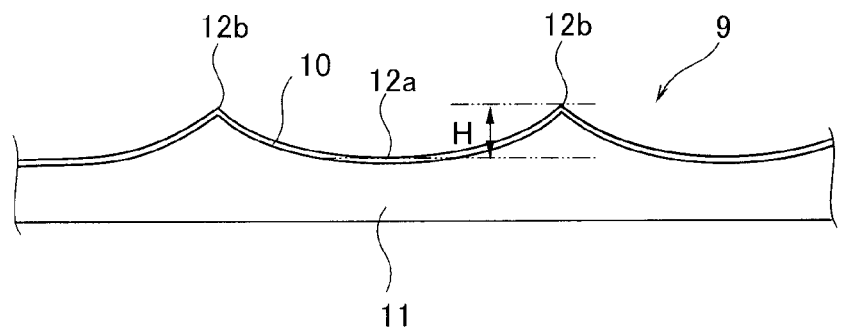
FIG. 4 is an enlarged view of a substantial part of FIG. 3.
Figure 5:
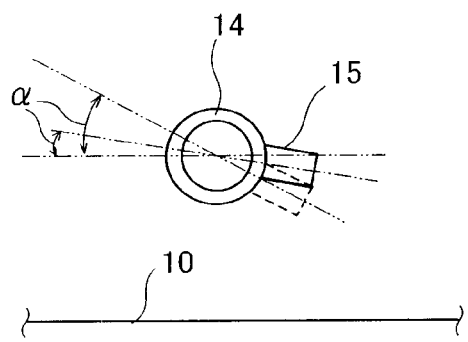
FIG. 5 is an enlarged cross-sectional fragmentary view taken along B-B in FIG. 2.
Figure 6:
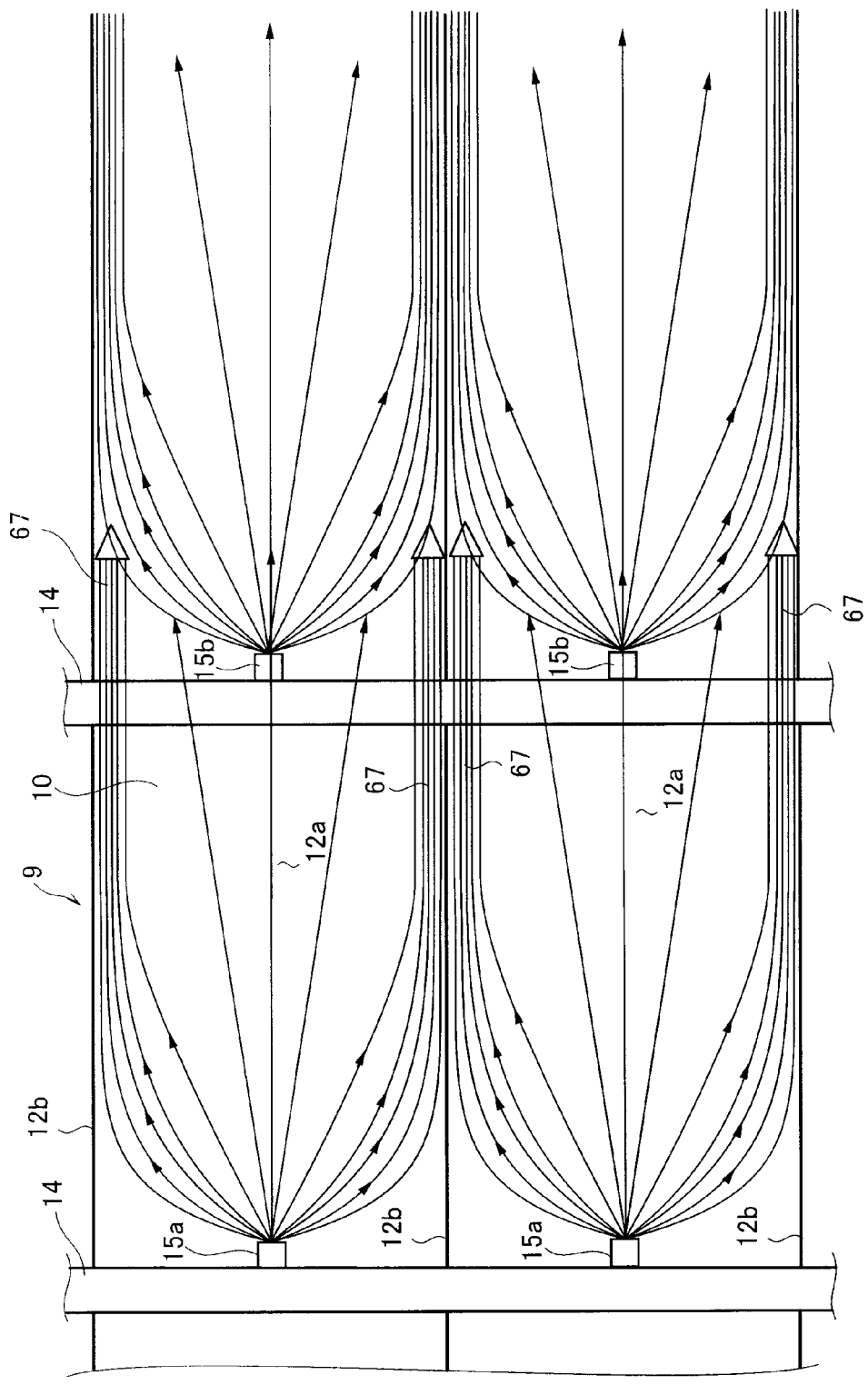
FIG. 6 is an explanatory diagram of operations of the first embodiment.

Hereinafter, embodiments of the present invention will be described with reference to the accompanying drawings. In the drawings: FIG. 1 is an explanatory diagram of a schematic configuration of a first embodiment of a device for filtering a processing liquid in a processing tank according to the present invention; FIG. 2 is a plan view of the same; FIG. 3 is a cross-sectional fragmentary view taken along A-A in FIG. 2; FIG. 4 is an enlarged view of a substantial part of FIG. 3; FIG. 5 is an enlarged cross-sectional fragmentary view taken along B-B in FIG. 2; and FIG. 6 is an explanatory diagram of operations of the first embodiment.

As illustrated in FIGS. 1 and 2, a first embodiment of a device for filtering a processing liquid in a processing tank according to the present invention is included in a processing tank 2 in which an automotive body W is immersed in a processing liquid 1 to be subjected to processes such as degreasing and cleaning. A conveyor 3 for suspending and immersing the automotive body W in the processing liquid 1 while conveying the automotive body W in a direction indicated by an arrow F (work-conveying direction) is installed above the processing tank 2. A separating part (second recovery part) 4 that recovers foreign material together with the processing liquid is provided on an upper surface of the processing tank 2 on a receiving-side of the automotive body W, and a hopper (third recovery part) 5 that recovers foreign material together with the processing liquid is provided on a bottom surface of the processing tank 2 on the same receiving-side of the automotive body W. In addition, an opening for extracting foreign material (first recovery part) 6 that recovers foreign material together with the processing liquid in a direction perpendicular to the work-conveying direction is provided on an upper surface of the processing tank 2 on a discharging-side of the automotive body W.

In addition, an inclined part 7 is formed on the processing tank 2 on the discharging-side of the automotive body W. A grooved part 9 having a plurality of concave and convex shapes is formed along the work-conveying direction on a bottom surface 8 of the processing tank 2, which continues to the inclined part 7. As illustrated in FIG. 3, the grooved part 9 is formed by welding and bonding together a plurality of steel plate members 10 having a plurality of concave and convex shapes (a shape in which gutter shapes are arranged side by side) manufactured by press-molding, and reinforcing an outer frame of the welded and bonded steel plate members 10 with a reinforcing member 11. Concavities 12a of the grooved part 9 are bottom parts of the steel plate members 10, and convexities 12b of the grooved part 9 are ridges of the steel plate members 10. In addition, as illustrated in FIG. 4, a cross section of the steel plate member 10 is formed by a portion of an elliptical shape whose major axis is positioned in a width direction of the processing tank 2 and whose minor axis is positioned in a height direction of the processing tank 2. The elliptical shape of the steel plate member 10, which is applied in the present invention, favorably has a major axis-to-minor axis ratio ranging from 1:1 to 8:1. Furthermore, a height H of the steel plate member 10 is equal to or shorter than one half of the minor axis.

A first processing liquid supply pipe 13 is arranged on one side in the work-conveying direction of the bottom surface 6 of the processing tank 2, and a plurality of first branch pipes 14 branched from the first processing liquid supply pipe 13 extends above the grooved part 9 at regular intervals in a direction perpendicular to the work-conveying direction so as to abut the ridges 12b of the grooved part 9. In addition, a first processing liquid discharge nozzle 15 facing the center of the bottom part 12a of the grooved part 9 is mounted at a section of each first branch pipe 14 opposing the bottom part 12a. The first processing liquid discharge nozzle 15 is arranged obliquely downward in an opposite direction to the work-conveying direction. As illustrated in FIG. 5, the processing liquid discharge nozzle 15 is installed in a direction opposite to the work-conveying direction and with an elevation angle α ranging from 10° to 60° ($10° \leq α \leq 60°$) with respect to the bottom part 12a of the grooved part 9.

In addition, branch pipes 17 branched from a second processing liquid supply pipe 16 are arranged on both sides of the processing tank 2, and second branch pipes 18 branched from the branch pipes 17 are arranged at regular intervals in the vicinity of both lateral inner surfaces of the processing tank 2 in a height direction of the processing tank 2. A second processing liquid discharge nozzle 19 is arranged obliquely inward at each second branch pipe 18 in a direction opposite to the work-conveying direction.

A plurality of branch pipes 6a is connected to the opening for extracting foreign material (first recovery part) 6, and the branch pipes 6a are connected to a first suction pipe 22 via a manifold 20 and an open/close valve 21. The first suction pipe 22 is connected to a filtered liquid discharge pipe 26 connected to a filtered liquid discharge outlet 25b of a large-size first cyclone device 25 via an open/close valve 27. The first cyclone device 25 has a waste liquid supply inlet 25a, the filtered liquid discharge outlet 25b, and a discharge outlet 25c. The filtered liquid discharge pipe 26 is connected via an open/close valve 28, a pump 29, and an open/close valve 30 to a waste liquid supply inlet 31a of a second cyclone device 31 in which single cyclone devices are connected in parallel. The second cyclone device 31 has the waste liquid supply inlet 31a, a filtered liquid discharge outlet 31b, and a discharge outlet 31c. The filtered liquid discharge outlet 31b of the second cyclone device 31 is connected to the second processing liquid supply pipe 16 via an open/close valve 32.

In addition, the waste liquid supply inlet 25a of the first cyclone device 25 is connected via an open/close valve 34 to a third suction pipe 33 connected to a distal end-side wall of the hopper (third recovery part) 5. Processing liquid 1 including relatively large foreign material is guided from the third suction pipe 33 to the waste liquid supply inlet 25a of the first cyclone device 25. Furthermore, a foreign material discharge pipe 35 is connected via an open/close valve 36, a storage part 37, and an open/close valve 38 to the discharge outlet 25c of the first cyclone device 25. When the first cyclone device 25 is in operation, the open/close valve 38 on a downstream side is normally closed and the open/close valve 36 on an upstream side is normally opened. In this state, foreign material and the filtered processing liquid 1 are separated and the foreign material is accumulated in the storage part 37.

Subsequently, the upstream-side open/close valve 36 is regularly closed and the downstream-side open/close valve 38 is regularly opened to flush the foreign material accumulated in the storage part 37. Once the flushing is completed, the downstream-side open/close valve 38 is closed and the upstream-side open/close valve 36 is opened to restore a normal state. Although the foreign material separated by the first cyclone device 25 is temporarily retained in the discharge outlet 25c during the removal of the foreign material in the storage part 37, the foreign material is only retained for a short period of time and therefore does not constitute a problem.

In addition, a second suction pipe 40 is connected to a bottom surface of the separating part (second recovery part) 4. The second suction pipe 40 is connected via an open/close valve 41, a pump 42, and an open/close valve 43 to a waste liquid supply inlet 44a of a third cyclone device 44 in which single cyclone devices are connected in parallel. The third cyclone device 44 has the waste liquid supply inlet 44a, a filtered liquid discharge outlet 44b, and a discharge outlet 44c. A filtered liquid discharge pipe 46 is connected via an open/close valve 45 to the filtered liquid discharge outlet 44b of the third cyclone device 44, and the filtered liquid discharge pipe 46 is further connected via an open/close valve 47, a heat exchanger 48, and an open/close valve 49 to the waste liquid supply inlet 50a of a fourth cyclone device 50 in which single cyclone devices are connected in parallel.

The fourth cyclone device 50 has the waste liquid supply inlet 50a, a filtered liquid discharge outlet 50b, and a discharge outlet 50c. A filtered liquid discharge pipe 52 is connected via an open/close valve 51 to the filtered liquid discharge outlet 50b of the fourth cyclone device 50, and the filtered liquid discharge pipe 52 is further connected via an open/close valve 53 to the first processing liquid supply pipe 13. In addition, a branch pipe 54 extends from the middle of the filtered liquid discharge pipe 52, and branch pipes 55 respectively erected on both sides of the processing tank 2 on the discharging-side of the automotive body W are connected to the branch pipe 54. A plurality of cleaning nozzles 56 facing the automotive body W emerging from the tank is installed at the branch pipes 55.

As described above, the second cyclone device 31, the third cyclone device 44, and the fourth cyclone device 50 are respectively configured such that single cyclone devices are connected in parallel, wherein one of the cyclone devices is activated by opening the open/close valves on the sides of the waste liquid supply inlets 31a, 44a, and 50a and the filtered liquid discharge outlets 31b, 44b, and 50b, and by closing the open/close valves on the sides of the discharge outlets 31c, 44c, and 50c. At this point, the other cyclone device is in an inactive state, wherein by closing the open/close valves on the sides of the waste liquid supply inlets 31a, 44a, and 50a and the filtered liquid discharge outlets 31b, 44b, and 50b, and by opening the open/close valves on the sides of the discharge outlets 31c, 44c, and 50c, the foreign materials accumulated at the discharge outlets 31c, 44c, and 50c are flushed toward the separating tank 60. In the above configuration, an operational state and an inoperational state are alternately repeated with each passage of a given amount of time.

The discharge outlet 31c of the second cyclone device 31, the discharge outlet 44c of the third cyclone device 44, the discharge outlet 50c of the fourth cyclone device 50, and the discharge outlet 5a provided on a distal end of the hopper (third recovery part) 5 are respectively connected via an open/close valve 61 to the foreign material discharge pipe 35. In addition, the foreign material discharge pipe 35 is guided to the separating tank 60 including a screw conveyor 62. Furthermore, a waste liquid supply pipe 63 is connected to an upper part of a side wall of the separating tank 60, and the waste liquid supply pipe 63 is connected via a pump 64 to a waste liquid supply inlet 65a of a fifth cyclone device 65. The fifth cyclone device 65 has the waste liquid supply inlet 65a, a filtered liquid discharge outlet 65b, and a discharge outlet 65c. The filtered liquid discharge outlet 65b of the fifth cyclone device 65 is connected to the second processing liquid supply pipe 16 via a filtered liquid discharge pipe 66.

Operations of the first embodiment of a device for filtering a processing liquid in a processing tank according to the present invention and configured as described above, and a method of filtering a processing liquid in a processing tank according to the present invention, will now be described. As illustrated in FIG. 6, a processing liquid 1 ejected from the first processing liquid discharge nozzle 15a of the first branch pipe 14 positioned on a downstream-side in a work-conveying direction initially flows from the center of each bottom part 12a of the grooved part 9 toward ridges 12b on both sides of the center, then converges in a vicinity of the ridges 12b on both sides, becomes a strong flow 67 along the ridges 12b, and further flows toward the side of the hopper 5.

The processing liquid 1 that flows toward the side of the hopper 5 then joins a flow of the processing liquid 1 ejected from the first processing liquid discharge nozzle 15b of the first branch pipe 14 positioned on an upstream-side of the aforementioned first processing liquid discharge nozzle 15 in the work-conveying direction and further flows toward the side of the hopper 5. At this point, foreign material with a relatively high specific gravity which otherwise settles and accumulates on the bottom surface 6 of the processing tank 2 is carried by the flow of the processing liquid 1 ejected from the first processing liquid discharge nozzle 15 and converges in a vicinity of the ridges 12b, consecutively flows to the side of the hopper 5, and is ultimately collected inside the hopper 5.

At this point, if the major axis-to-minor axis ratio of the elliptical shape of the steel plate member 10 is less than 1:1, a curvature in the vicinity of the ridge 12b increases, making it difficult to collect foreign material with a relatively high specific gravity in the vicinity of the ridges 12b on both sides by having the foreign material join the flow of the processing liquid 1 ejected from the first processing liquid discharge nozzle 15 and to have the foreign material converge at and flow from the vicinity of the ridge 12b on both sides. Consequently, a problem arises in that foreign material settles and accumulates in the vicinity of the ridge 12b on both sides. When a discharge pressure of the first processing liquid discharge nozzle 15 is increased in order to prevent such a problem, another problem arises in that the processing liquid 1 discharged toward the bottom surface 8 of the processing tank 2 gyrates upward as a turbulent flow and causes the foreign material to scatter.

In addition, if the major axis-to-minor axis ratio of the elliptical shape of the steel plate member 10 exceeds 8:1, an ejection flow of the processing liquid 1 ejected from the first processing liquid discharge nozzle 15 diffuses, making it difficult to have foreign material with a relatively high specific gravity flow to a position of an ejection flow of the processing liquid 1 ejected from the first processing liquid discharge nozzle 15 of the first branch pipe 14 positioned on an upstream-side in the work-conveying direction. Consequently, a problem arises in that foreign material settles and accumulates midway. While installation intervals of the first branch pipes 14 must be shortened in order to prevent such a problem, shortening the installation intervals increases the numbers of the first branch pipes 14 and the first processing liquid discharge nozzles 15, resulting in greater cost.

Furthermore, the height H of the steel plate member 10 is desirably equal to or shorter than one half of the minor axis for similar reasons as the major axis-to-minor axis ratio of the elliptical shape of the steel plate member 10. In addition, as for the elevation angle $\alpha$ of the first processing liquid discharge nozzle 15, an elevation angle $\alpha$ that is less than 10° makes it difficult to have foreign material with a relatively high specific gravity flow towards the hopper 5. Consequently, a problem arises in that foreign material settles and accumulates. On the other hand, if the elevation angle α of the first processing liquid discharge nozzle 15 exceeds 60°, a problem arises in that a turbulent flow is generated, causing the foreign material to gyrate upward and adhere to the automotive work W.

Next, a part of the foreign material with a relatively high specific gravity that is collected in the hopper 5 passes through the third suction pipe 33 together with the processing liquid 1 and is supplied by the suction force of the pump 29 into the first cyclone device 25 from the waste liquid supply inlet 25a of the first cyclone device 25. The foreign material is then separated from the filtered liquid by a cyclone effect of the first cyclone device 25, whereby due to the suction force of the pump 29, the filtered liquid is supplied from the filtered liquid discharge outlet 25b through the filtered liquid discharge pipe 26 and into the second cyclone device 31 from the waste liquid supply inlet 31a of the second cyclone device 31. The foreign material inside the filtered liquid is then removed by a cyclone effect of the second cyclone device 31. The filtered liquid after filtering then passes from the filtered liquid discharge outlet 31b through the second processing liquid supply pipe 16, the branch pipe 17, and the second branch pipe 18 and is ejected from each second processing liquid discharge nozzle 19.

When the automotive body W is mounted on a hanger 3a of the conveyor 3 and immersed in the processing liquid 1 in the processing tank 2, the processing liquid 1 is sprayed onto the automotive body W by each second processing liquid discharge nozzle 19 and the foreign material adhered onto inside and outside surfaces of the automotive body W is removed. Among the foreign material removed in this manner, foreign material with a relatively low specific gravity is suspended in the intermediate layer of the processing liquid 1 in the processing tank 2 and accumulates inside the separating part 4. Due to the suction force of the pump 42, the accumulated foreign material with a relatively low specific gravity passes through the second suction pipe 40 connected to the bottom surface of the separating part 4 and is supplied into the third cyclone device 44 from the waste liquid supply inlet 44a of the third cyclone device 44. The foreign material is then separated from the filtered liquid by a cyclone effect of the third cyclone device 44, whereby due to the suction force of the pump 42, the filtered liquid passes from the filtered liquid discharge outlet 44b through the filtered liquid discharge pipe 46 and into the fourth cyclone device 50 from the waste liquid supply inlet 50a of the fourth cyclone device 50.

Furthermore, the foreign material inside the filtered liquid is then removed by a cyclone effect of the fourth cyclone device 50. The filtered liquid after filtering then passes from the filtered liquid discharge outlet 50b through the filtered liquid discharge pipe 52, the branch pipe 54, and the branch pipe 55, and is sprayed from each cleaning nozzle 56 toward the outer surface of the automotive body W immediately after the automotive body W emerges from the processing tank 2. Although foreign material with a relatively low specific gravity is suspended on the surface of the processing liquid 1 and then re-adheres to the automotive body W when the automotive body W emerges from the tank, the filtered liquid after filtering that is ejected from each cleaning nozzle reliably removes the foreign material.

The foreign material with a small specific gravity suspended on the surface of the processing liquid 1 is collected at the inclined part 7 by a reversed flow that is generated when an ejection flow of the processing liquid 1 ejected from each second processing liquid discharge nozzle 19 in an opposite direction to the work-conveying direction collides with a wall surface of the separating part 4. The foreign material with a small specific gravity collected in this manner is suctioned by the suction force of the pump 29 from the opening for extracting foreign material 6, passes through the branch pipe 6a, the manifold 20, and the first suction pipe 22, and is supplied into the second cyclone device 31 from the waste liquid supply inlet 31a of the second cyclone device 31 to be processed in a similar manner.

In addition, since the first cyclone device 25 separates a large amount of the foreign material, the foreign material is accumulated in the storage part 37 provided downstream of the discharge outlet 25c, passes through the foreign material discharge pipe 35, and is delivered to the separating tank 60. Furthermore, foreign materials separated by the second cyclone device 31, the third cyclone device 44, and the fourth cyclone device 50 are passed together with the processing liquid 1 from the respective discharge outlets 31c, 44c, and 50c through the foreign material discharge pipe 35 and are delivered to the separating tank 60. Due to the suction force of the pump 64, processing liquid 1 with a high concentration of foreign material that is accumulated in the separating tank 60 passes through the waste liquid supply pipe 63 and is supplied into the fifth cyclone device 65 from the waste liquid supply inlet 65a of the fifth cyclone device 65.

A cyclone effect of the fifth cyclone device 65 then separates the foreign material from the re-filtered processing liquid 1, whereby the filtered processing liquid 1 passes from the filtered liquid discharge outlet 65b through the filtered liquid discharge pipe 66 and the second processing liquid supply pipe 16 and is returned into the processing tank 2. On the other hand, the separated foreign material is delivered from the discharge outlet 65c to the separating tank 60. The foreign material settled to the bottom part of the separating tank 60 is lifted upward by the screw conveyor 62. At this point, the processing liquid 1 flows down to the separating tank 60 along the helix of the screw, whereby only the foreign material is carried outside by the screw to be processed. By adopting such a configuration, only foreign material can be reliably removed without having to expel the processing liquid 1.

Figure 7:
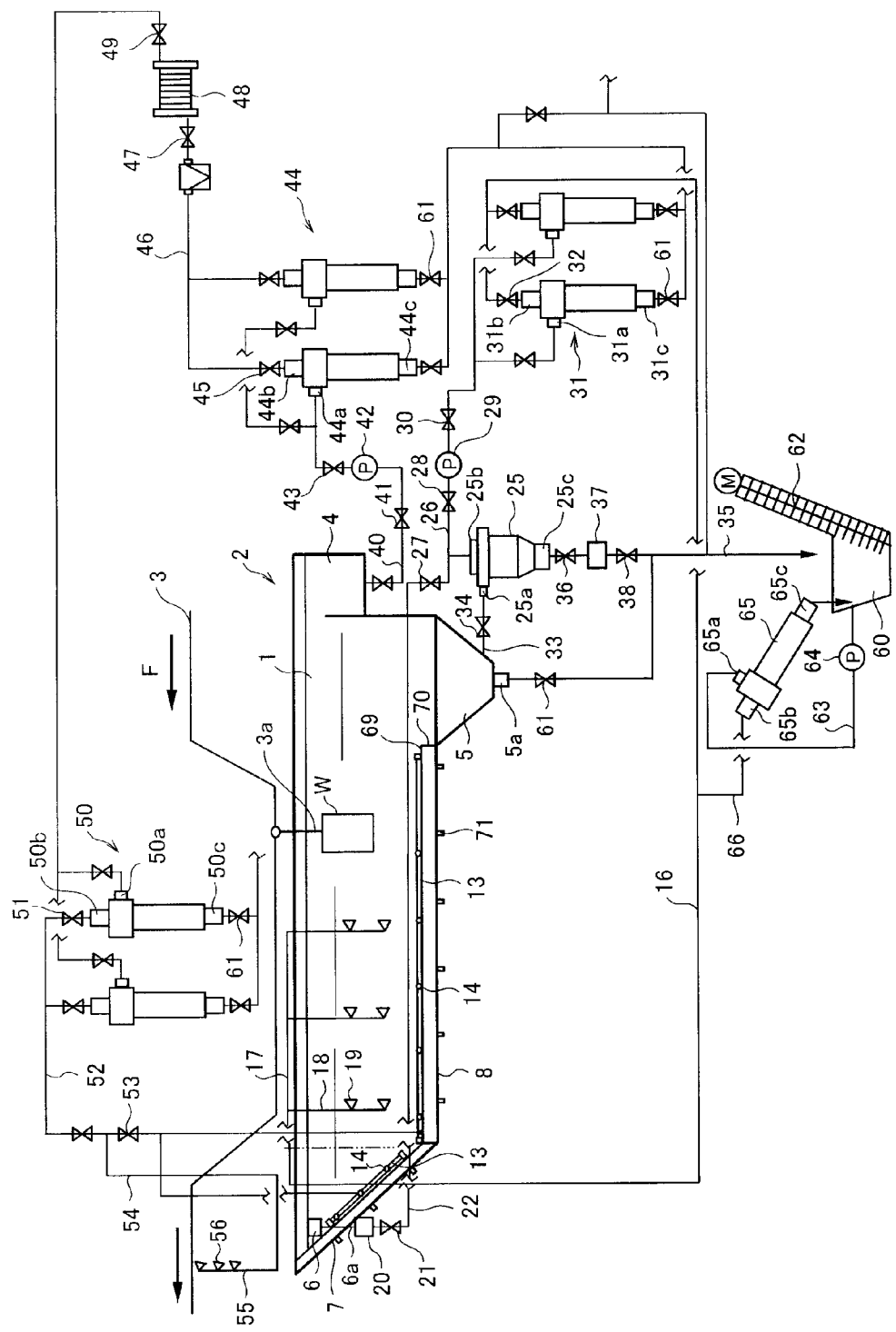
FIG. 7 is an explanatory diagram of a schematic configuration of a second embodiment of a device for filtering a processing liquid in a processing tank according to the present invention.
Figure 8:
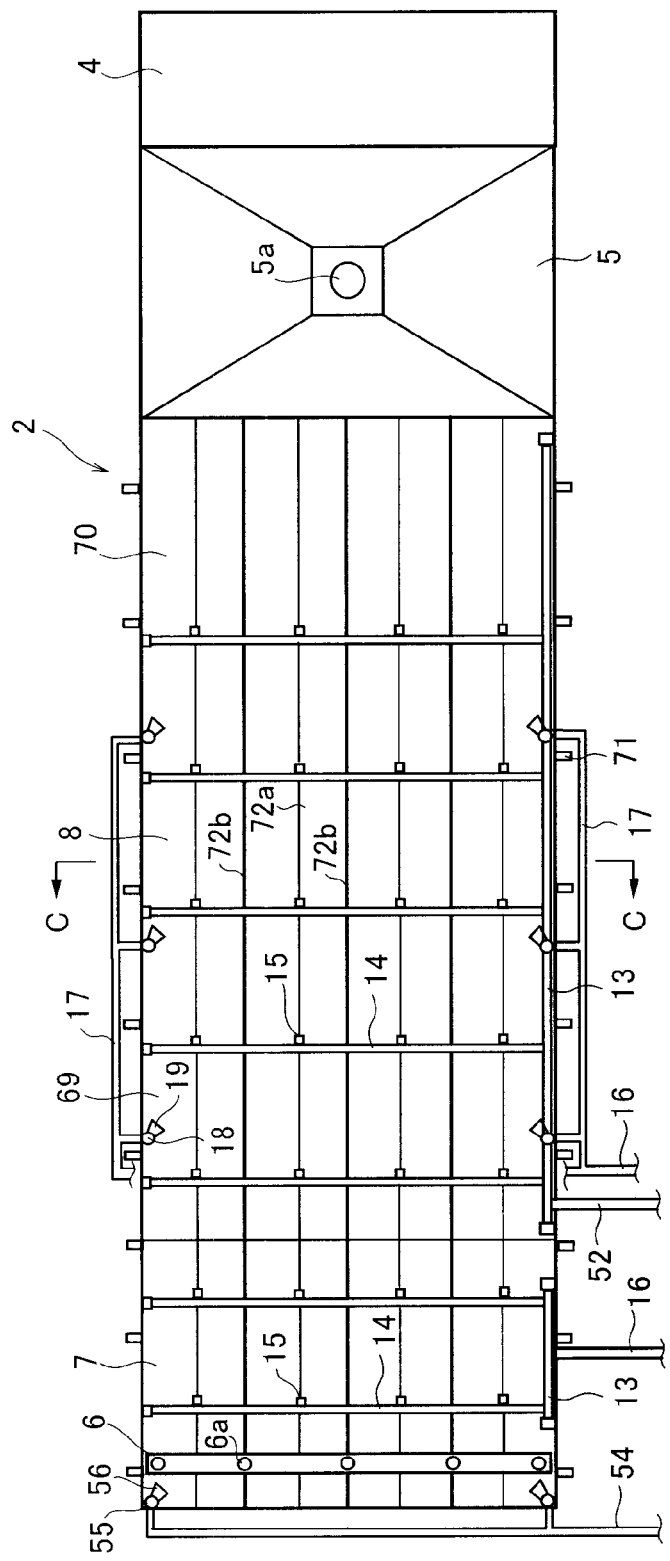
FIG. 8 is a plan view of the second embodiment of a device for filtering a processing liquid in a processing tank according to the present invention.
Figure 9:
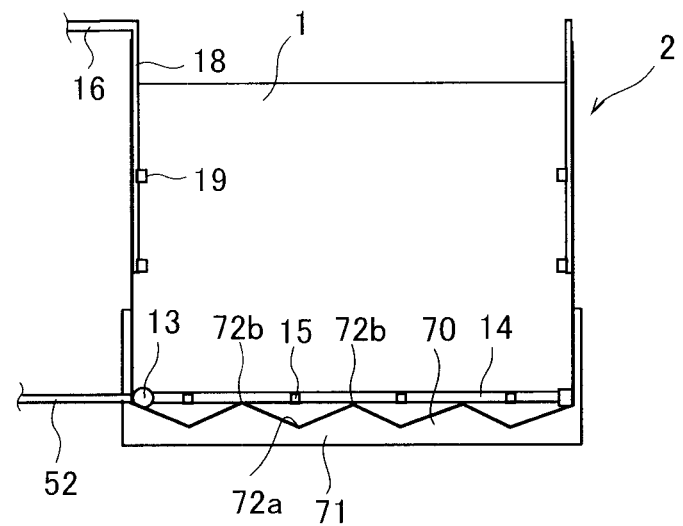
FIG. 9 is a cross-sectional fragmentary view taken along C-C in FIG. 8.
Figure 10:
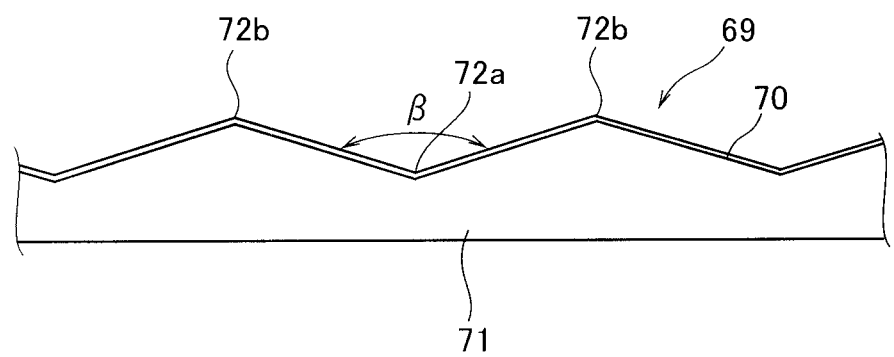
FIG. 10 is an enlarged view of a substantial part of FIG. 9.

Next, as illustrated in FIGS. 7 and 8, a second embodiment of a device for filtering a processing liquid in a processing tank according to the present invention differs from the first embodiment in the shape of a grooved part 69 formed on a bottom surface 8 of a processing tank 2. Otherwise, the configuration is the same as the first embodiment. As illustrated in FIG. 9, a cross section of the grooved part 69 is formed in a serrated shape. The grooved part 69 is formed by welding and bonding together a plurality of steel plate members 70 having a plurality of concave and convex shapes (a shape in which serrated shapes are arranged side by side), and reinforcing an outer frame of the welded and bonded steel plate members 70 with a reinforcing member 71. Concavities 72a of the grooved part 69 are valleys of the steel plate members 70, and convexities 72b of the grooved part 69 are ridges of the steel plate members 70. In addition, as illustrated in FIG. 10, an angle β of the valley 72a that constitutes the grooved part 69 is to range between 90° and 165°.

Figure 11:
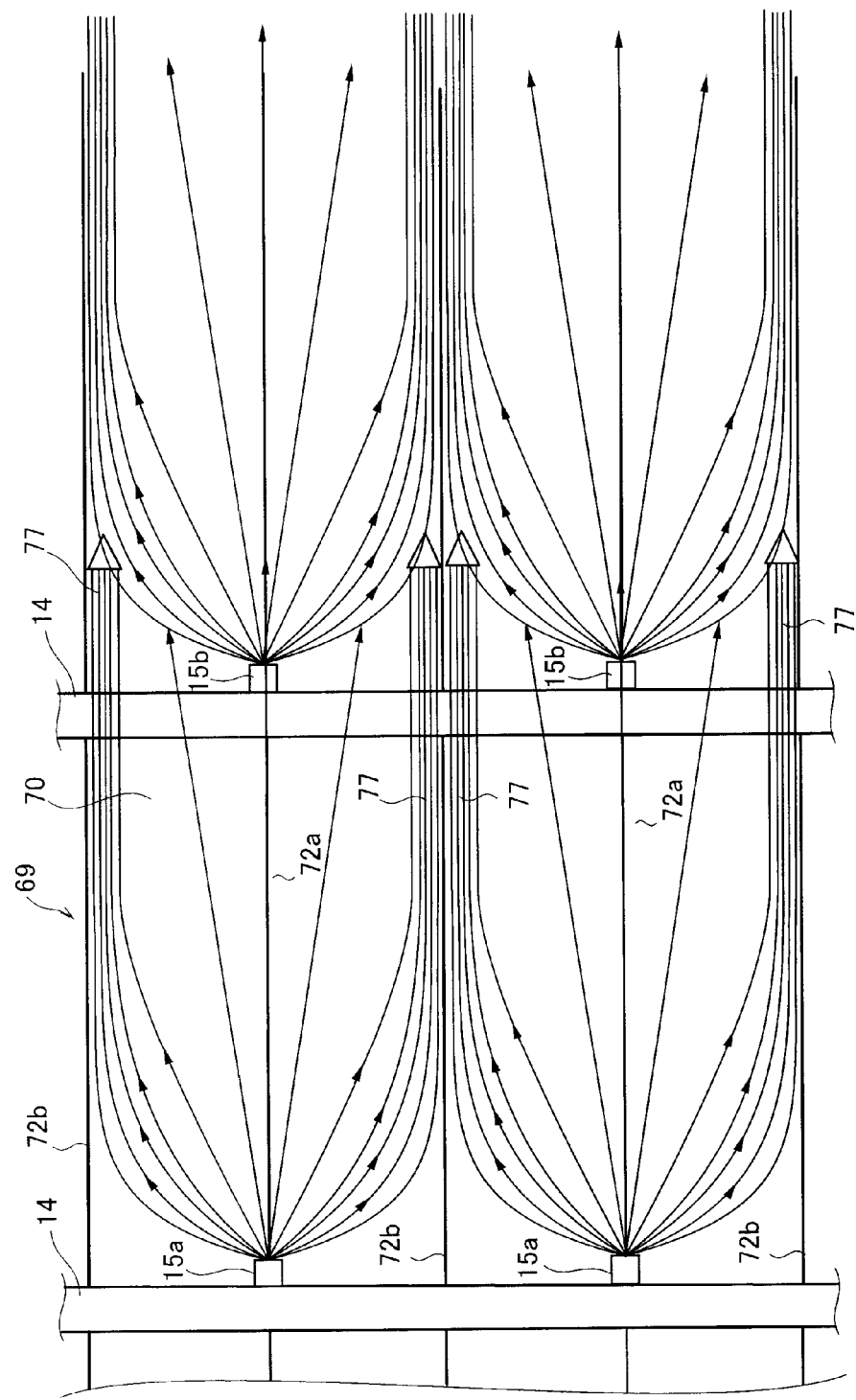
FIG. 11 is an explanatory diagram of operations of the second embodiment.

Operations of the second embodiment of a device for filtering a processing liquid in a processing tank according to the present invention and configured as described above, and a method of filtering a processing liquid in a processing tank according to the present invention, will now be described. As illustrated in FIG. 11, a processing liquid 1 ejected from a first processing liquid discharge nozzle 15a of a first branch pipe 14 positioned on a downstream-side in a work-conveying direction initially flows from the center of each valley 72a of the grooved part 69 toward ridges 72b on both sides of the center, then converges in a vicinity of the ridges 72b on both sides, becomes a strong flow 77 along the ridges 72b, and further flows toward the side of a hopper 5.

The processing liquid 1 that flows toward the side of the hopper 5 then joins a flow of the processing liquid 1 ejected from a first processing liquid discharge nozzle 15b of the first branch pipe 14 positioned on an upstream-side in the work-conveying direction of the aforementioned first processing liquid discharge nozzle 15 and further flows toward the side of the hopper 5. At this point, foreign material with a relatively high specific gravity which otherwise settles and accumulates on the bottom surface 8 of the processing tank 2 is carried by the flow of the processing liquid 1 ejected from the first processing liquid discharge nozzle 15 and converges in a vicinity of the ridges 72b, consecutively flows to the side of the hopper 5, and is ultimately collected inside the hopper 5. Otherwise, operations are the same as the first embodiment.

At this point, if the angle β of the valley 72a exceeds 165°, an incline from the valley 72a to the ridge 72b becomes less steep. Consequently, an ejection flow of the processing liquid 1 ejected from the first processing liquid discharge nozzle 15 diffuses, making it difficult to have foreign material with a relatively high specific gravity flow to a position of an ejection flow of the processing liquid 1 ejected from the first processing liquid discharge nozzle 15 of an adjacent first branch pipe 14, and causes the foreign material to accumulate. In particular, it becomes difficult for ejection flows of the processing liquid 1 ejected from the first processing liquid discharge nozzles 15 to converge and flow in the vicinity of the ridges 72b on both sides, creating a problem in that foreign material settles and accumulates in the vicinity of the ridges 72b on both sides.

When a discharge pressure of the first processing liquid discharge nozzle 15 is increased in order to prevent such a problem, another problem arises in that the processing liquid 1 ejected toward the bottom surface 8 gyrates upward as a turbulent flow and causes the foreign material to scatter. On the other hand, if the angle β is less than 90°, an incline from the valley 72a to the ridge 72b becomes steep. Consequently, it becomes difficult for ejection flows of the processing liquid 1 ejected from the first processing liquid discharge nozzles 15 to converge in the vicinity of the ridges 72b on both sides, creating a problem in that foreign material settles and accumulates in the vicinity of the ridges 72b on both sides. An angle β of less than 90° also reduces the intervals of the ridges 72b, causing an increase in the number of the first processing liquid discharge nozzles 15 and resulting in greater cost.

In addition, as for the elevation angle α of the first processing liquid discharge nozzle 15, an elevation angle α that is less than 10° makes it difficult to have foreign material with a relatively high specific gravity flow towards the hopper 5. Consequently, a problem arises in that foreign material settles and accumulates. On the other hand, if the elevation angle α of the first processing liquid discharge nozzle 15 exceeds 60°, a problem arises in that a turbulent flow is generated, causing the foreign material to gyrate upward and adhere to the automotive work W.

Furthermore, as illustrated in FIGS. 7 and 8, a configuration may be adopted in which a grooved part 69 similar to that of the bottom surface 8 is also formed in the inclined part 7 of the processing tank 2, a plurality of first branch pipes 14 branched from the first processing liquid supply pipe 13 is provided at regular intervals in the same manner as the bottom surface 8, and the first processing liquid discharge nozzle 15 facing the center of the valley 72a of the grooved part 69 is mounted on a section of each first branch pipe 14 opposing the valley 72a. Moreover, a configuration may also be adopted in the first embodiment in which a grooved part 9 is formed at the inclined part 7 of the processing tank 2, a plurality of first branch pipes 14 branched from the first processing liquid supply pipe 13 is provided at the grooved part 9 at regular intervals in the same manner as the bottom surface 8, and the first processing liquid discharge nozzle 15 facing the center of the bottom part 12a of the grooved part 9 is mounted on a section of each first branch pipe 14 opposing the bottom part 12a.

Industrial Applicability

According to the present invention, since foreign material that is either suspended or accumulated in the processing tank can be collected together with the processing liquid by the respective recovery parts and foreign material can be reliably separated and removed from the processing liquid by the separating means and, at the same time, the filtered processing liquid can be reused without having to be discarded, a device and a method of filtering a processing liquid in a processing tank capable of effectively utilizing the processing liquid can be provided.

The invention claimed is:

1. A device for filtering a processing liquid in a processing tank in which a conveyed work is immersed in the processing liquid to be processed,
   an inclined part is formed on a work-discharging side of the processing tank;
   an opening for extracting foreign material for collecting a surface-layer processing liquid including a foreign material with a small specific gravity suspended on the processing liquid which faces from a work-receiving side to the work-discharging side of the processing tank is formed on an upper surface of the work-discharging side of the processing tank, the foreign material with the small specific gravity being foreign material with specific gravity that causes the foreign material to be suspended at the surface-layer of the processing liquid in the processing tank;
   a separating part for collecting an intermediate-layer processing liquid including a foreign material with a relatively low specific gravity suspended on the processing liquid which faces from the work-discharging side to the work-receiving side of the processing tank is formed on an upper surface of the work-receiving side of the processing tank, the foreign material with the relatively low specific gravity being foreign material with specific gravity that causes the foreign material to be suspended between the surface-layer of the processing liquid and a bottom of the processing liquid in the processing tank;
   a hopper for collecting a bottom-layer processing liquid including a foreign material with a high specific gravity is formed on a bottom surface on the work-receiving side of the processing tank, the foreign material with the high specific gravity being foreign material with specific gravity that causes the foreign material to settle to the bottom of the processing liquid in the processing tank;
   a grooved part having a plurality of concave and convex shapes is formed toward the hopper in a work-conveying direction at least on the bottom surface of the processing tank which continues to the inclined part, a cross section of the grooved part is elliptical shaped so as to define a major axis and a minor axis in which a ratio of the major axis and the minor axis is from 1:1 to 8:1, and a height is equal to or shorter than one half of the minor axis, or the cross section is formed in a serrated shape and the convexities are ridges and the concavities are valleys, and an angle of each of the valleys is between 90° and 165°;

first processing liquid discharge nozzles which are oriented in an opposite direction to the work-conveying direction and toward the bottom surface are arranged to opposing a center of the concavities of the grooved part;

second processing liquid discharge nozzles which are oriented in the opposite direction to the work-conveying direction and toward the conveyed work are arranged on both side surfaces of the processing tank; and a wall surface for collecting the surface-layer processing liquid including the foreign material with the small specific gravity suspended at the inclined part formed on the work-discharging side of the processing tank from a reversed flow of the processing liquid that is generated when the processing liquid which is sprayed from the second processing liquid discharge nozzles toward the inclined part collides with the separating part of the processing tank, wherein the device for filtering the processing liquid in the processing tank comprises:

first separating means which respectively separate the foreign material from the processing liquids recovered by the opening for extracting foreign material, the separating part, and the hopper, wherein the first separating means are connected to the opening for extracting foreign material, the separating part, and the hopper by a pipe;

a separating tank for storing a processing liquid with foreign material separated by the first separating means, wherein the separating tank is connected to the first separating means by a pipe;

second separating means which separate only the foreign material from the processing liquid stored in the separating tank and return the separated foreign material from the processing liquid to the separating tank, wherein the second separating means is connected to the separating tank; and discharging means which separate only the foreign material from the processing liquid stored in the separating tank and which discharge the foreign material, wherein the processing liquid which is separated from the foreign material by the first and second separating means is sprayed into the processing tank by the first processing liquid discharge nozzles and the second processing liquid discharge nozzles which are connected to the first and second separating means by pipe, wherein the first separating means and the second separating means are connected to the second processing liquid discharge nozzles by pipe, and the first separating means are connected to the first processing liquid discharge nozzles by pipe.

2. The filtering device of processing liquid in a processing tank according to claim 1, wherein at least the separating part and the hopper are connected to the first separating means that is made up of two or more separating means connected in cascade.

3. The filtering device of processing liquid in a processing tank according to claim 1, wherein the first and second separating means have a cyclone mechanism.

4. The filtering device of processing liquid in a processing tank according to claim 2, wherein the first and second separating means has a cyclone mechanism.

* * * * *